UNITED STATES PATENT OFFICE 2,653,137

SURFACE ACTIVE COMPOUNDS

William B. Hughes and Everett B. Fisher, Bartlesville, Okla., assignors to Cities Service Research and Development Company, New York, N. Y., a corporation of New Jersey No Drawing. Application January 4, 1951, Serial No. 204,473

8 Claims. (Cl. 252—338)

This invention relates to new compositions of matter having surface active properties and more particularly to certain amine salts of substituted naphthalene sulfonic acids which are particularly useful in the breaking of emulsions such as oil field emulsions.

One of the most troublesome problems met with in crude oil production relates to the breaking of water-in-oil emulsions formed in wells producing both water and brine. These emulsions are generally of two types, the first type a mechanically cut emulsion, which is usually formed in the well by faulty pumping equipment, the other type being a gas-cut emulsion, the formation of which is aided by the emulsifying action of certain asphaltenes and other chemical emulsifiers present in the crude oil. The emulsion commonly encountered is a mixture of both of these types, and its properties will vary from well to well, and even from day to day in the same well. Unless these emulsions can be effectively and completely broken, the oil content is lost. It is also desirable that the emulsion be broken as rapidly as possible, in order to keep the size and number of settling tanks to a minimum.

There are apparently two phases of an emulsion resolving problem. The first involves a surface phenomenon in which the oil film surrounding the water particles of micron size is weakened, allowing the particles to coalesce into larger droplets. This phase will be hereinafter referred to as the emulsion breaking step. The other phase involves the splitting of the broken emulsion into separate oil and water phases. This phase will be referred to as the water separation step.

It will be evident from the foregoing that the ideal emulsion resolving agent must be effective to break both mechanical-cut and gas-cut emulsions with substantially equal facility, must rapidly break the emulsion, and must be effective in causing rapid water separation from the broken emulsion. The agent must also be effective in very small concentrations, in order to hold the treating cost to a minimum.

It is an object of this invention to provide a series of compounds which will rapidly resolve emulsions of all types, giving rapid break and complete water separation, and which are effective in very small concentrations.

It has been found that emulsion breaker agents which will accomplish the foregoing object may be produced by first reacting benzaldehyde and an alkyl amine in approximately equimolar quantities, further reacting the alkyl amine reaction product with a further molar quantity polyethylene amine, such as diethylenetriamine, triethylenetetramine, or tetraethylenepentamine, and neutralizing this second intermediate product to a methyl orange end point with propylated naphthalene sulfonic acid. Any alkyl amine appears to be suitable, but we find that primary alkyl amines having from about 8 to about 18 carbon atoms per molecule give best results. The use of benzaldehyde appears to go to the essence of the invention, since those similar compounds prepared with nonaromatic aldehydes have not proven satisfactory for our purpose. It is quite important that the reagents be reacted in the order indicated above since if the benzaldehyde is first reacted with the polyethylene amine, and the alkyl amine is thereafter added, the resultant product is not at all outstanding as an emulsion breaker.

Compounds prepared as above show excellent characteristics both in breaking and water separation, are equal to or better than the best commercial emulsion breakers presently available, and form part of the present invention. We have found, however, that even more efficient compositions may be prepared by further reacting the second intermediate product with from about 1 to about 10 mols of formaldehyde prior to neutralization with the propylated naphthalene sulfonic acid.

We have found that it is preferable to first mix the benzaldehyde and the alkyl amine, which will react spontaneously with the evolution of heat. However, in order to drive overhead the water formed in the reaction and to insure that the reaction will go to completion, we prefer to heat the mixture for about 45 minutes at slightly above 100° C. Similarly, a spontaneous exothermic reaction takes place when the polyethylene amine is added to the benzaldehyde-alkyl amine reaction product. This second reaction will go to completion in time, but in order to speed the reaction, it is preferable to heat for another 45 minutes at slightly over 100° C. The formaldehyde, if desired, is next added, preferably in the form of paraformaldehyde, since otherwise it would be necessary to drive overhead the entire water content of an aqueous formaldehyde solution. The mixture should be heated until no solid paraformaldehyde appears in the reaction mixture. Propylated naphthalene sulfonic acid is then added to neutralize the mixture to a methyl orange end point. The reaction with the propylated naphthalene sulfonic acid is quite vigorous and it should be added in small increments to prevent boiling over of the mixture. No added heat is necessary in this step.

The nature of the chemical reaction which takes place in each of the three steps is unknown, but it is probable that a number of possible reaction products is formed, and that they are present in equilibrium in the mixture. Suffice it to say that it is apparent that some kind of reaction takes place in each of the first two steps, since considerable heat is evolved upon mixing the reagents, and in the third step the paraformaldehyde must combine chemically with the second intermediate product, since otherwise, it would remain in solid form.

In order that those skilled in the art may more fully understand the nature of our invention, and the method of preparation of our novel compounds, the following example is given:

*Example*

One mol (106 grams) benzaldehyde was mixed with one mol (206 grams) of a commercial mixture of alkyl amines averaging about 12 carbon atoms to the molecule, and the mixture was heated until water ceased to evolve overhead, at a temperature slightly above 100° C., the operation taking about 45 minutes.

One mol (189 grams) of tetraethylenepentamine was added to this reaction product, and the mixture was heated for an additional 45 minutes. Five mols (150 grams) of formaldehyde, in the form of paraformaldehyde, was then added and heating was continued until no solid paraformaldehyde could be observed in the mixture. This product was then cooled and the product was neutralized to a methyl orange end point with propylated naphthalene sulfonic acid.

The propylated naphthalene sulfonic acid which we use in the formulation of our new compositions may be prepared according to the directions given by Walker in U. S. Patent No. 1,875,165. This compound has the formula

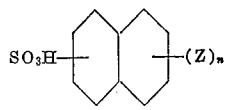

in which Z is an isopropyl radical and $n$ is a whole number from 1 to 4.

The various products produced as described above have been subjected to various tests, both in the field and in the laboratory, and have proven outstanding in resolving water-in-oil emulsions, such as are commonly met with in oil production, with respect to both breaking and water separation action. While the effectiveness of these compounds will vary from well to well, depending upon the emulsion produced by the particular well, it has been found that excellent results have been obtained when the products are used in concentrations as low as 40 parts per million, and they are in general far superior to the best of the commercial breakers now on the market, which are generally ineffective at concentrations less than 250 parts per million.

Having now described our invention, what we claim as new and useful is:

1. The method of resolving emulsions comprising mixing with a petroleum water-in-oil emulsion a resolving agent consisting of the product prepared by reacting about one mol of benzaldehyde with about one mol of an alkyl amine to form a first intermediate product heating the reaction mixture whereby to drive off water formed in the reaction, reacting the first intermediate product with about one mol of a polyethylene amine to form a second intermediate product, and neutralizing the second intermediate product to a methyl orange end point with propylated naphthalene sulfonic acid, the agent being mixed in an amount small but sufficient to cause substantial resolution of the emulsion, allowing the emulsion to settle into a water phase and an oil phase, and separating the oil from the water.

2. The method according to claim 1 including, in preparing the resolving agent, adding from one to ten mols of formaldehyde in the form of paraformaldehyde, and heating the mixture at a temperature of about 100° C. until no solid paraformaldehyde is left in the mixture prior to neutralization.

3. The method according to claim 2 in which the alkyl amine has from 8 to 18 carbon atoms per molecule.

4. The method according to claim 2 in which the alkyl amine is a mixture of primary alkyl amines of from 8 to 18 carbon atoms, and averaging about 12 carbon atoms, and the polyethylene amine is tetraethylenepentamine.

5. The method of resolving emulsions comprising mixing with a petroleum water-in-oil emulsion a resolving agent consisting of the product prepared by mixing about one mol of benzaldehyde with about one mol of an alkyl amine, heating at a temperature slightly in excess of 100° C. until water formed by the reaction of the benzaldehyde and the amine ceases to evolve, whereby to form a first intermediate product, adding about one mole of a polyethylene amine, continuing to heat at a temperature slightly in excess of 100° C. for a period of about 45 minutes whereby to form a second intermediate product, and neutralizing the latter to a methyl orange end point with propylated naphthalene sulfonic acid, the agent being mixed in an amount small but sufficient to cause substantial resolution of the emulsion, allowing the emulsion to settle into an aqueous phase and an oil phase, and separating the oil from the water.

6. The method according to claim 5 including, in preparing the resolving agent, adding from one to ten mols of formaldehyde in the form of paraformaldehyde to the second intermediate product and continuing to heat the mixture until no solid paraformaldehyde is left in the mixture, prior to neutralization.

7. The process according to claim 6 in which the alkyl amine has from 8 to 18 carbon atoms per molecule.

8. The process according to claim 6 in which the alkyl amine is a mixture of primary alkyl amines of from 8 to 18 carbon atoms, and averaging 12 carbon atoms, and the polyethylene amine is tetraethylenepentamine.

WILLIAM B. HUGHES.
EVERETT B. FISHER.

References Cited in the file of this patent

UNITED STATES PATENTS

| Number | Name | Date |
| --- | --- | --- |
| 2,083,225 | De Groote | June 8, 1937 |
| 2,223,935 | Daniels | Dec. 3, 1940 |
| 2,321,496 | Liberthson | June 8, 1943 |